US008098401B2

(12) United States Patent
Veregin et al.

(10) Patent No.: US 8,098,401 B2
(45) Date of Patent: Jan. 17, 2012

(54) METHOD AND APPARATUS FOR PRINTING THAT CONSIDERS AN UNDESIRABLE OPTICAL DENSITY PRINTING RANGE

(75) Inventors: Richard P. N. Veregin, Mississauga (CA); Karen A. Moffat, Brantford (CA); Dale R. Mashtare, Bloomfield, NY (US); Daryl W. Vanbesien, Burlington (CA); Jordan H. Wosnick, Toronto (CA); Cuong Vong, Hamilton (CA); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 740 days.

(21) Appl. No.: 12/198,407

(22) Filed: Aug. 26, 2008

(65) Prior Publication Data
US 2010/0053643 A1    Mar. 4, 2010

(51) Int. Cl.
*G06F 15/00* (2006.01)
*B41J 2/47* (2006.01)

(52) U.S. Cl. ........... 358/1.9; 358/1.8; 358/3.1; 358/515; 358/518; 358/520; 358/521; 358/529; 358/406; 358/1.13; 358/1.14; 358/1.15; 382/100; 382/151; 382/162; 382/169; 382/272; 382/284; 399/11; 399/12; 399/46; 399/49; 399/58; 399/60; 399/104; 399/297; 347/7; 347/15; 347/43; 347/84; 347/151; 347/158; 347/188; 347/240; 347/251; 347/254

(58) Field of Classification Search .............. None
See application file for complete search history.

(56) References Cited

U.S. PATENT DOCUMENTS

| 4,196,453 | A * | 4/1980 | Warren | 358/447 |
| 6,498,910 | B2 * | 12/2002 | Haneda | 399/51 |
| 6,707,930 | B2 * | 3/2004 | Kalker et al. | 382/100 |
| 7,054,030 | B2 * | 5/2006 | Maltz | 358/1.9 |

* cited by examiner

*Primary Examiner* — Steven Kau
(74) *Attorney, Agent, or Firm* — Oliff & Berridge, PLC

(57) ABSTRACT

Aspects of the disclosure provide a printing method that can utilize a lightly pigmented toner along with a darkly pigmented toner to improve the image quality. The method can include receiving a dataset corresponding to a printing of a printing system using a darkly pigmented toner. The printing system may have an undesirable optical density printing range for the darkly pigmented toner. Further, the method can include converting the dataset to a first dataset corresponding to a first printing of the printing system using the darkly pigmented toner, and a second dataset corresponding to a second printing of the printing system using a lightly pigmented toner. The first dataset can avoid the undesirable optical density printing range for the darkly pigmented toner, and a combination of the first printing and the second printing providing a substantially same printed optical density corresponding to the received dataset.

19 Claims, 5 Drawing Sheets

| INPUT | OUTPUT 1 | OUTPUT 2 |
|---|---|---|
| 0 | 0 | 0 |
| 1 | 1 | 0 |
| 2 | 2 | 0 |
| ⋮ | ⋮ | ⋮ |
| 77 | 77 | 0 |
| 78 | 27 | 255 |
| 79 | 28 | 255 |
| ⋮ | ⋮ | ⋮ |
| 127 | 76 | 255 |
| 128 | 77 | 255 |
| 129 | 129 | 0 |
| 130 | 130 | 0 |
| 131 | 131 | 0 |
| ⋮ | ⋮ | ⋮ |
| 255 | 255 | 0 |

FIG. 4

METHOD AND APPARATUS FOR PRINTING THAT CONSIDERS AN UNDESIRABLE OPTICAL DENSITY PRINTING RANGE

BACKGROUND

A printing system may apply a halftone technology to produce a non-saturated optical density, which can be less than 100%, using a fully pigmented toner. The halftone technology can use a dot patterning technique to simulate the non-saturated optical density. However, the dot patterning technique may introduce visible image noises due to the patterning nature and toner scattering. Additionally, the image noises can be evident for certain optical density, such as highlight through midtone, where visual perception can be most sensitive and Xerographic instabilities can be most prevalent. This may adversely affect the image quality.

SUMMARY

Aspects of the disclosure can provide a printing method that can utilize a lightly pigmented toner along with a darkly pigmented toner to improve the image quality.

The method can include receiving a dataset corresponding to a printing of a printing system using a darkly pigmented toner. The printing system may have an undesirable optical density printing range for the darkly pigmented toner. Further, the method can include converting the dataset to a first dataset corresponding to a first printing of the printing system using the darkly pigmented toner, and a second dataset corresponding to a second printing of the printing system using a lightly pigmented toner. The first dataset can avoid the undesirable optical density printing range for the darkly pigmented toner, and a combination of the first printing and the second printing providing a substantially same printed optical density corresponding to the received dataset.

According to an aspect of the disclosure, the undesirable optical density printing range may be within a midtone region of grey levels other than simply highlights. Further, the undesirable optical density printing range may result in a peak noise range.

To convert the received dataset to the first dataset and the second dataset, the method can further include converting the dataset to the first dataset and the second dataset based on a tone reproduction curve (TRC).

Further, the method may include determining a loading of the lightly pigmented toner based on the undesirable optical density printing range.

According to an aspect of the disclosure, the darkly pigmented toner can include an emulsion aggregation toner. Similarly, the lightly pigmented toner can include an emulsion aggregation toner.

In an example, to convert the dataset to the first dataset and the second dataset, the method can include converting a value in the dataset that is in the undesirable optical density printing range to a first value in the first dataset that is below the undesirable optical density printing range, and a second value in the second dataset that is constant.

In another example, to convert the dataset to the first dataset and the second dataset, the method can include converting a value in the dataset that is in the undesirable optical density printing range to a first value in the first dataset that is below the undesirable optical density printing range, and a second value in the second dataset.

In another example, to convert the dataset to the first dataset and the second dataset, the method can convert a value in the dataset that is in the undesirable optical density printing range to a first value in the first dataset that is constant and below the undesirable optical density printing range, and a second value in the second dataset.

Aspects of the disclosure can also provide a controller for printing. The controller can be configured to receive a dataset corresponding to a printing of a printing system using a darkly pigmented toner. The printing system may have an undesirable optical density printing range for the darkly pigmented toner. The controller can be further configured to convert the dataset to a first dataset corresponding to a first printing of the printing system using the darkly pigmented toner, and a second dataset corresponding to a second printing of the printing system using a lightly pigmented toner. The first dataset can avoid the undesirable optical density printing range for the darkly pigmented toner, and a combination of the first printing and the second printing can provide a substantially same printed optical density corresponding to the received dataset.

Aspects of the disclosure can provide a printing system. The printing system can include a first developer configured to provide a darkly pigmented toner for development. The printing system may have an undesirable optical density printing range for the darkly pigmented toner. The printing system may further include a second developer configured to provide a lightly pigmented toner for development, and a controller configured to provide a first dataset corresponding to a first printing of the printing system using the first developer, and a second dataset corresponding to a second printing of the printing system using the second developer. Thus, the first dataset can avoid the undesirable optical density printing range for the darkly pigmented toner. The controller may be further configured to combine a first toner image from the first printing and a second toner image from the second printing.

BRIEF DESCRIPTION OF THE DRAWINGS

Various exemplary embodiments of this disclosure will be described in detail with reference to the following figures, wherein like numerals reference like elements, and wherein:

FIG. 4 shows an exemplary data structure for an exemplary set of tone reproduction curves.

EMBODIMENTS

Figure 1:
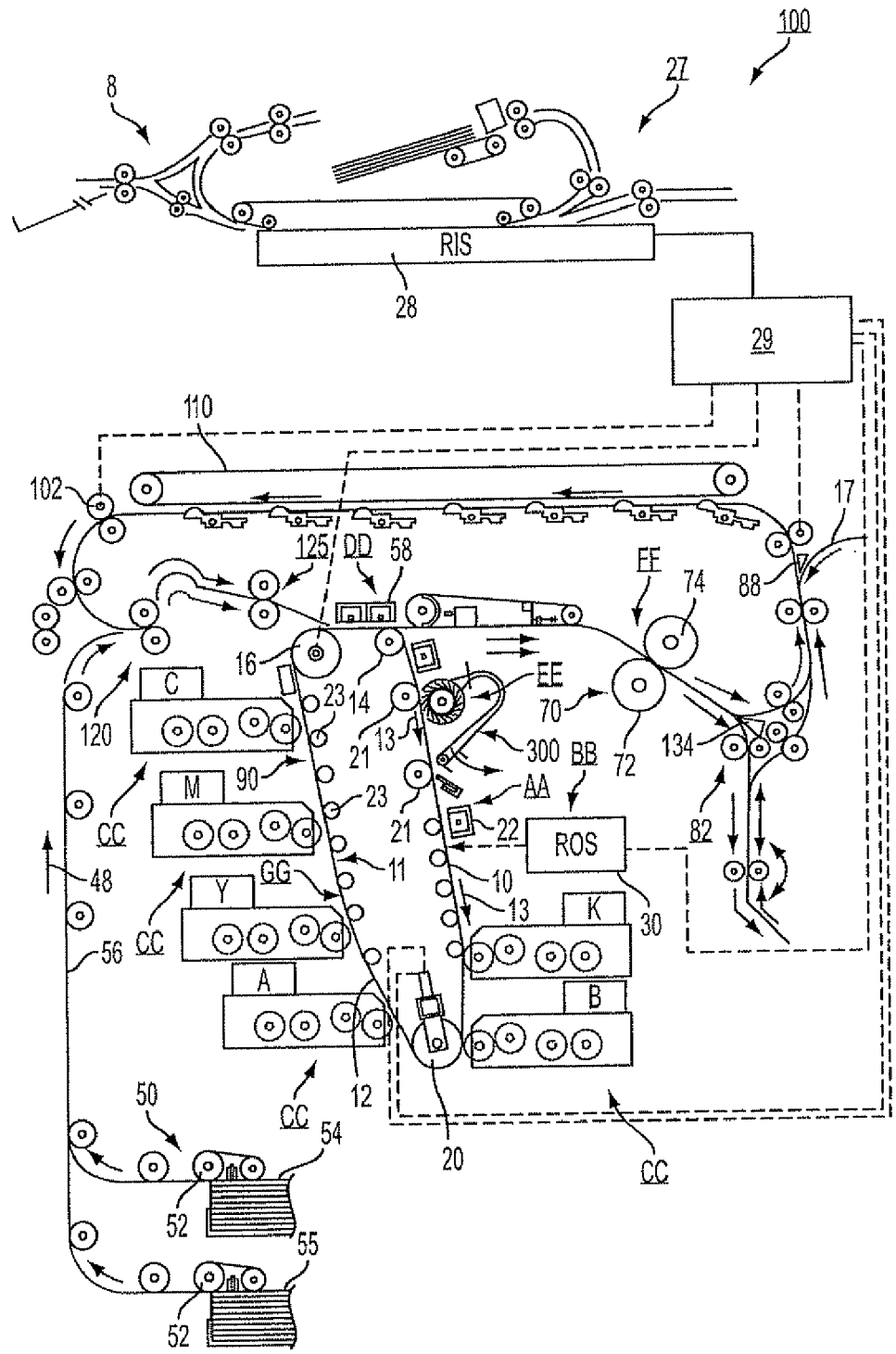
FIG. 1 shows an exemplary printing system that is capable utilizing a lightly pigmented toner to improve image quality.

FIG. 1 shows a schematic elevational view of an exemplary printing system that is capable of utilizing a lightly pigmented toner combined with a darkly pigmented toner to improve image quality. The printing system 100 can include various components, such as a photoreceptor device GG, a cleaning system EE, a charging system AA, an exposing system BB, a developing system CC, a transferring system DD, a fusing system FF, and the like, that can support creating desired images. These elements can be coupled as shown in FIG. 1.

The photoreceptor device GG can be implemented in the form of a photoreceptor belt with a coated layer of photoconductive material. The photoreceptor device GG can move in a direction of arrow 13 to advance successively to other components of the printing system 100. It should be noted that the photoreceptor device GG can be implemented in other forms, such as a photoreceptor drum.

The cleaning system EE can remove particles, such as residue toner particles, from the surface of the photoreceptor device GG. The charging system AA can prepare the surface of the photoreceptor device GG with electrical charges for subsequent printing process. More specifically, the charging system AA can produce electric fields, such as corona, to charge the surface of the photoreceptor device GG to a substantial uniform potential.

The exposing system BB can include a light emitting device, such as a semiconductor laser device, to emit a light beam having an intensity corresponding to a desired image. The light beam can pass through an optical system, and scan the surface of the photoreceptor device GG. Therefore, the electric potential of the photoreceptor device GG can be modified by the light beam to create an electrostatic latent image.

The developing system CC may include a plurality of developers. For example, the developing system CC may include six developers K, Y, M, C, A and B in FIG. 1. A developer can bring a developing material, such as toner particles, in contact with the electrostatic latent image on the surface of the photoreceptor device GG. For example, the developer K may provide a black toner, the developer Y may provide a yellow toner, the developer M may provide a magenta toner, and the developer C may provide a cyan toner. The toner particles can be attached to the surface of the photoreceptor device GG according to the electrostatic latent image to create a toner image.

According to the disclosure, the developers A and B can be configured to provide additional toners, such as a lightly pigmented toner, to improve image quality In an embodiment, the developers K, Y, M and C can be configured to provide darkly pigmented toners, such as fully pigmented black toner, yellow toner, magenta toner and cyan toner, respectively. In addition, the developers A and B can be configured to provide lightly pigmented toners, such as a lightly pigmented cyan toner and a lightly pigmented magenta toner, respectively. In an embodiment, the order of the lightly pigmented cyan and the lightly pigmented magenta toner can be reversed in developers B and A respectively.

Generally, a printing system can use halftone techniques to print a non-saturated optical density, which can be less than 100%, with a fully pigmented toner. The halftone techniques can use dot patterning techniques to simulate the non-saturated optical density. For example, a halftone technique may print a non-saturated optical density by printing a pattern in a unit area using a fully pigmented toner. The pattern can cover less than 100% of the unit area by applying the fully pigmented toner in a binary manner. Therefore, the pattern may be perceived by human eyes having the non-saturated optical density.

However, the halftone techniques can introduce image noises due to the patterning nature and toner scattering. The image noises may result in mottle, and may adversely affect color image qualities. The mottle can be evident in an image area having an optical density within a midtone region, due to the reasons that visual perception can be most sensitive to those optical densities. The midtone region may include grey levels of optical densities other than simply the highlights. In addition, a printing system may be most unstable at those optical densities. In an embodiment, a printing system may be unstable and have a peak noise at a midtone optical density, such as about 0.4 optical density, and may produce unacceptable mottle at the midtone optical density. Additionally, the mottle can be more evident for certain image areas, such as close-up faces, cloud-free sky, and the like.

According to the disclosure, the printing system 100 may utilize a lightly pigmented toner combined with a darkly pigmented toner to improve image quality. In an embodiment, the printing system 100 may print a first toner image and a second toner image of a same hue corresponding to a desired toner image. The first toner image can be printed using a fully pigmented toner, and the second toner image can be printed using a lightly pigmented toner. A combination of the first toner image and the second toner image can result in the desired toner image. Consequently, image noises can be reduced due to the reasons that the first toner image can be printed in a manner avoiding a noise sensitive optical density range of the printing system 100, and the second toner image can be printed in a manner to increase color uniformity.

In an embodiment, the printing system 100 may use an emulsion aggregation (EA) toner in a fully pigmented toner. The EA toner can additionally reduce image noises due to the reasons that the EA toner may have a smaller toner size, and the particles of the EA toner can have a more uniform size and shape. Further, the printing system 100 may use an EA toner in a lightly pigmented toner.

The transferring system DD can then transfer a toner image from the surface of the photoreceptor device GG to a supporting sheet, such as a piece of paper. Further, the fusing system FF can permanently fuse the toner image on the supporting sheet.

During operation, for example, the surface of the photoreceptor device GG can turn to the cleaning system EE. The cleaning system EE can remove residue toner particles from a previous printing. Then, the surface of the photoreceptor device GG can move to the charging system AA. The charging system AA can charge the surface of the photoreceptor device GG to a substantially uniform potential. Subsequently, the surface of the photoreceptor device GG can move to the exposing system BB. The exposing system BB can dissipate the charges on the surface of the photoreceptor device GG according to a desired image to produce an electrostatic latent image.

Further, a developer of the developing system CC can apply toner particles to the surface of the photoreceptor device GG. The toner particles can adhere to the surface of the photoreceptor device GG according to the electrostatic latent image, and thereby create a toner image. The toner image can then be transferred to a supporting sheet. In addition to the CMYK toners, the printer system 100 can be configured to provide additional toners, such as lightly pigmented magenta toner and lightly pigmented cyan toner, from developers A and B to improve image qualities.

Additionally, the printing system 100 may include a controller 29. The controller 29 can be coupled with components of the printing system 100, and can enable the printing system 100 to operate according to the disclosure. More specifically, the controller 29 may control the components of the printing system 100 to print a first toner image and a second toner image of a same hue. The first toner image can be printed using a darkly pigmented toner, such as a fully pigmented toner, and the second toner image can be printed using a lightly pigmented toner of the same hue. A combination of the first toner image and the second toner image can result in a substantially same optical density toner image as the optical density of a desired toner image.

In an embodiment, the controller 29 can be configured to receive a dataset for a desired toner image. The dataset may result in printing an optical density in a noise sensitive optical density range of the printing system 100. The controller 29 may output a first dataset and a second data set. The first dataset may result in producing a first toner image using the fully pigmented toner. The second dataset may result in producing a second toner image using a lightly pigmented toner. A combination of the first toner image and the second toner image can have substantially the same optical density as the optical density of the desired toner image. In addition, the first dataset may result in printing optical densities below or beyond the noise sensitive optical density range.

More specifically, the controller 29 may control the exposing system BB to generate a first electrostatic image according to the first dataset. Further, the controller 29 may control a developer with the fully pigmented toner to apply toner particles to the first electrostatic image to generate the first toner image, and control the transferring system DD to transfer the first toner image to a piece of paper. Additionally, the controller 29 may control the exposing system BB to generate a second electrostatic image according to the second dataset. Then, the controller 29 may control a developer with the lightly pigmented toner to apply toner particles to the second electrostatic image to generate the second toner image, and control the transferring system DD to transfer the second toner image to the piece of paper.

In another embodiment, the controller 29 may receive a first dataset corresponding to a fully pigmented toner, and a second dataset corresponding to a lightly pigmented toner, for example from a processor (not shown) coupled to the printing system 100. In such an embodiment, the processor may know configurations of the printing system 100. The configurations may include a noise configuration of the printing system 100, and a toner configuration of the printing system 100. For example, the noise configuration may include a noise sensitive optical density range of the printing system 100. The noise sensitive optical density range may be in a midtone region that can include gray levels of optical densities other than simply the highlights. The toner configuration may include a fully pigmented toner with a lightly pigmented toner of a same hue.

Accordingly, the processor may generate a first dataset and a second dataset corresponding to a desired image. The first dataset can correspond to the fully pigmented toner, and the second dataset can correspond to a lightly pigmented toner. The first dataset can avoid the noise sensitive optical density range of the printing system 100. The second dataset may increase a color uniformity. Further, the first dataset and the second dataset can be transmitted to the controller 29, for example via a communication channel that couples the processor to the printing system 100. Subsequently, the controller 29 may control the printing system 100 to produce a first toner image using the fully pigmented toner, and produce a second toner image using the lightly pigmented toner.

In an embodiment, a loading of a lightly pigmented toner can be determined according to the printing system 100 to improve image qualities. The printing system 100 may include a noise sensitive optical density range for a darkly pigmented toner, such as a fully pigmented toner. The noise sensitive optical density range may include a range of optical densities that may result in high image noises if the optical densities are produced solely by the fully pigmented toner. The loading of the lightly pigmented toner can be determined based on the noise sensitive optical density range. For example, the loading of the lightly pigmented toner can be determined in a manner that the lightly pigmented toner can be primarily used to produce the optical densities in the noise sensitive optical density range, and the fully pigmented toner can be used below the noise sensitive optical density range.

Figure 2:
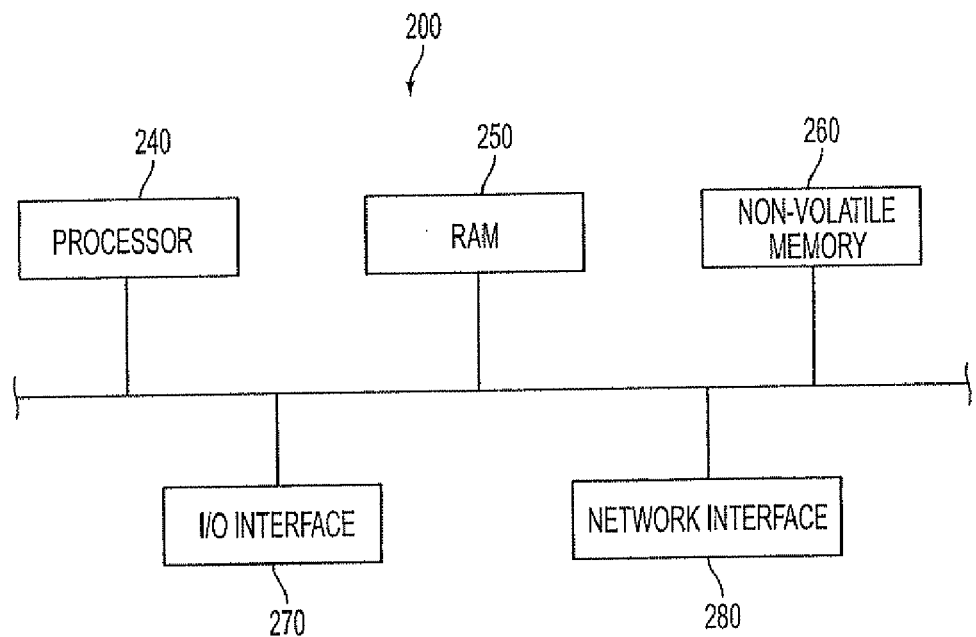
FIG. 2 shows a block diagram of an exemplary controller.

FIG. 2 shows a block diagram of an exemplary controller. The controller 210 can include various components, such as a processor 240, a non-volatile memory unit 260, a RAM unit 250, an input/output (IO) interface 270, a network interface 280, and the like. These components can be coupled together as shown in FIG. 2.

The processor 240 can execute system and application codes. More specifically, the processor 240 may execute codes for determining a first value and a second value corresponding to an input value. The input value may correspond to printing an optical density that may be in a noise sensitive optical density range of a printing system. The optical density can be obtained by a printing combination corresponding to the first value and the second value. In addition, the printing combination corresponding to the first value and the second value can avoid the noise sensitive optical density range of the printing system using the darkly pigmented toner.

The non-volatile memory unit 260 can store system and application codes that generally do not change, such as firmware. In an embodiment, the non-volatile memory may include a data structure, for example corresponding to a set of tone reproduction curves, that can map an input value to a first value and a second value.

The RAM unit 250 is writeable and readable, and can be accessed at a fast speed. It can be preferred that data and codes are in the RAM unit 250 for the processor 240 to access. The peripheral interface 270 can connect the controller 210 with peripheral devices, for example, a display screen. The network interface 280 can enable the controller 210 to communicate with other devices on a network.

During operation, the controller 210 may receive a printing job, for example from the network interface 280. The printing job can include a dataset corresponding a desired toner image that can be printed by a printing system. The printing system may print a toner image using a darkly pigmented toner according to the dataset. However, the dataset may include a value that may result in printing an optical density within a noise sensitive optical density range of the printing system. Therefore, the printing system may print the toner image with visible image noises, which may lower image qualities.

In an embodiment, the controller 210 may include a data structure, such as a look-up table, for the noise sensitive optical density range of the printing system. The data structure can be used to determine if a value is within the noise sensitive optical density range of the printing system.

Further, the controller 210 may include a set of tone reproduction curves (or a gray level mapping module), which can be stored in the RAM unit 250 or the non-volatile memory 260. The set of tone reproduction curves can be used to map the dataset of the printing job to a first dataset and a second dataset. More specifically, the set of tone reproduction curves can be used to map a value of the dataset to a first value of the first dataset and a second value of the second dataset. The first value and the second value can be mapped in a manner to avoid the noise sensitive optical density range of the printing system. The first dataset may result in a first toner image of the printing system, and the second dataset may result in a second toner image of the printing system. Further, a combination of the first toner image and the second toner image may result in a substantially same optical density image as the optical density of the desired toner image.

In an embodiment, the processor 240 may execute a software program including an algorithm that can map a dataset of the printing job to a first dataset and a second dataset. More specifically, a value of the dataset can be mapped to a first value of the first dataset, and a second value of the second dataset by the algorithm. The first value and the second value can be mapped in a manner to avoid the noise sensitive optical density range of the printing system. The first dataset may result in a first toner image of the printing system, and the second dataset may result in a second toner image of the printing system. A combination of the first toner image and the second toner image may result in a substantially same optical density image as the optical density of the desired toner image.

Figure 3A:
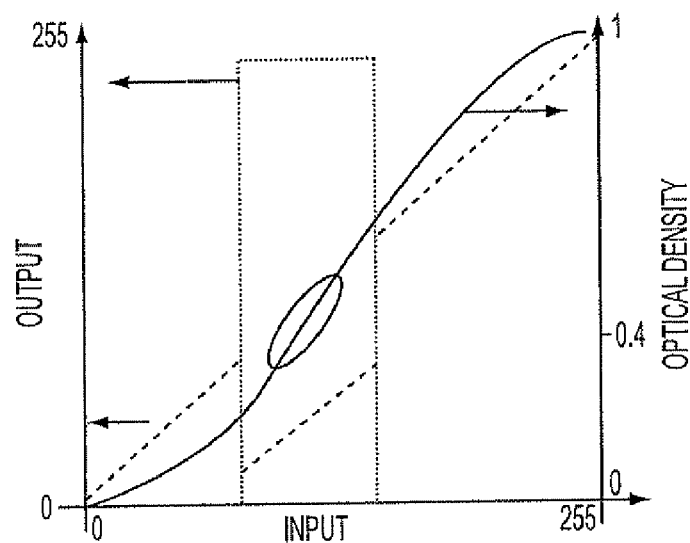
FIGS. 3A-3C show exemplary sets of tone reproduction curves.
Figure 3B:
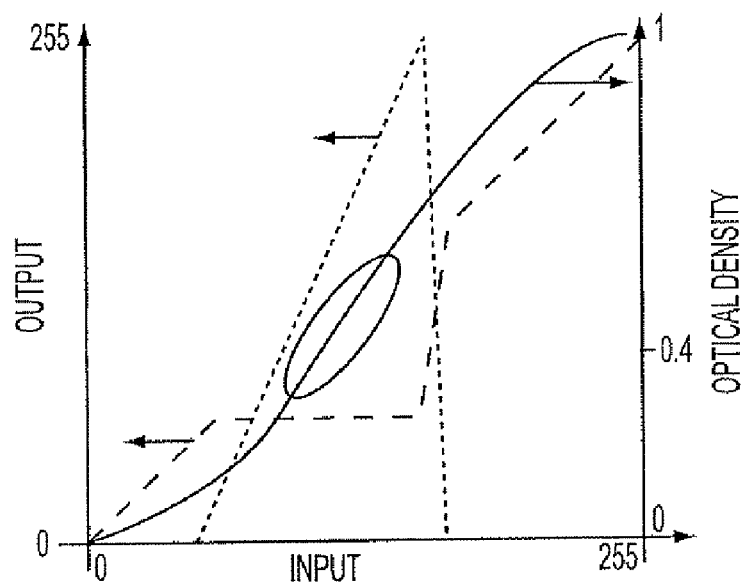
Figure 3C:
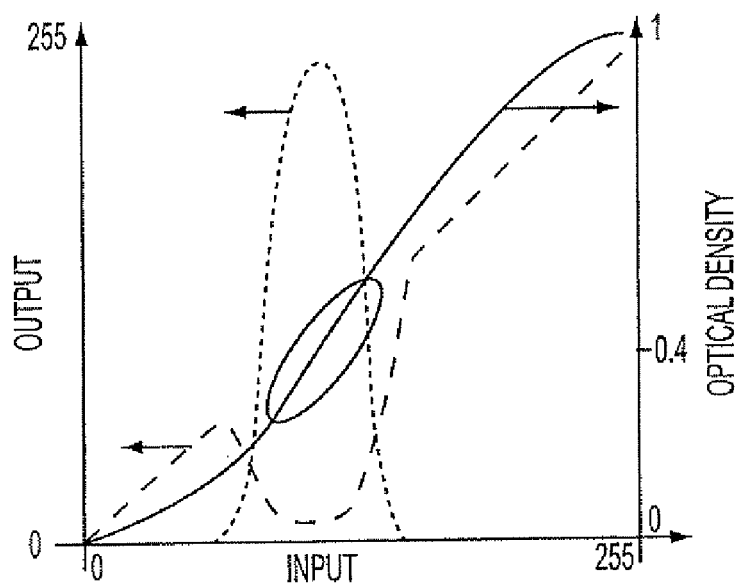

FIGS. 3A-3C show exemplary sets of tone reproduction curves. Each figure can include a solid line, a long dash line and a short dash line. The solid line can represent an optical density characteristic of a printing system. The long dash line and short dash line can represent a set of tone reproduction curves for a fully pigmented toner and a lightly pigmented toner, respectively.

In an embodiment, the optical density characteristic can be calibrated during a calibration process. The calibration process may determine an optical density corresponding to an input value for a printing system. The printing system may print according to the input value with a fully pigmented toner. Further, the calibration process may determine the printed image noise. Subsequently, the calibration process may determine a noise sensitive optical density range of the printing system. For example, the noise sensitive optical density range can be shown in a solid oval in FIG. 3A-FIG. 3C.

The set of tone reproduction curves can be used to map an input value of the printing system with a first value and a second value. The first value may correspond the fully pigmented toner, and the second value may correspond to the lightly pigmented toner. The set of tone reproduction curves can have various shapes.

FIG. 3A shows an exemplary set of tone reproduction curves where the lightly pigmented toner can be used in saturation in the noise sensitive region. In the example, the printing system may have the optical density characteristic as shown by the solid line. The optical density characteristic may include the noise sensitive optical density range as enclosed by the solid oval. The set of tone reproduction curves, which include the long dash line and the short dash line, can map an input to a first output and a second output, respectively. The first output can correspond to a first print with the fully pigmented toner, and the second output can correspond to a second print with the lightly pigmented toner.

As can be seen, the set of tone reproduction curves may map the input to the second output having a saturation value, such as 255 in the example, when the input has a value within the noise sensitive optical density range. The saturation value can control the printing system to print the lightly pigmented toner uniformly, for example in a unit printing area. In addition, the first output can be configured to avoid the noise sensitive optical density range. A printing combination of the first output and the second output can be substantially equivalent to a printing of the input.

FIG. 3B shows an exemplary set of tone reproduction curves where the fully pigmented toner can be utilized substantially constantly below the noise sensitive optical density range of the printing system. Similar to the example in FIG. 3A, the printing system may have the optical density characteristic as shown by the solid line. The optical density characteristic may include the noise sensitive optical density range as enclosed by the solid oval. The set of tone reproduction curves, which include the long dash line and the short dash line, can map an input with a first output and a second output, respectively. The first output can correspond to a first print with the fully pigmented toner, and the second output can correspond to a second print with the lightly pigmented toner.

As can be seen, the set of tone reproduction curves may map the input to the first output having a constant value below the noise sensitive optical density range of the printing system when the input has a value within the noise sensitive optical density range. In addition, the set of tone reproduction curves can be configured to vary the second output to obtain a substantially equivalent optical density as the input.

For the ease of description, constant values are used to present the disclosure. It should be noted that the set of tone reproduction curves for the fully pigmented toner and the lightly pigmented toner can be any shape that the first output can below the noise sensitive optical density range of the printing system.

FIG. 3C shows another exemplary set of tone reproduction curves for the fully pigmented toner and the lightly pigmented toner. Similar to the example in FIG. 3A, the printing system may have the optical density characteristic as shown by the solid line. The optical density characteristic may include the noise sensitive optical density range as enclosed by the solid oval. The set of tone reproduction curves, which includes the long dash line and the short dash line, can map an input with a first output and a second output, respectively. The first output can correspond to a first print with the fully pigmented toner, and the second output can correspond to a second print with the lightly pigmented toner.

As can be seen, the fully pigmented toner and the lightly pigmented toner may vary within the noise sensitive optical density range. However, a combination of the first output corresponding to the fully pigmented toner and the second output corresponding to the lightly pigmented toner can obtain a substantially equivalent optical density as the input.

FIG. 4 shows an exemplary data structure corresponding to the exemplary set of tone reproduction curves in FIG. 3A. The data structure 400 can be used to map an input value to a first output value and a second output value. The data structure 400 may include a field 410 for the input values, a field 420 for the first output values and a field 430 for the second output values. Each row of the data structure 400 can correspond to an input value with a first output value and a second output value. The field 410 may include a range 440 that can result in a printing within a noise sensitive optical density range of a printing system.

As can be seen, when the input value is out of the noise sensitive optical density range, the first output value can be configured to be the same as the input value and the second output value can be configured to be a lowest value, such as zero. However, when the input value is within the noise sensitive optical density range, the second output value can be a saturation value, such as 255, and the first output value can be below the noise sensitive optical density range.

Figure 5:
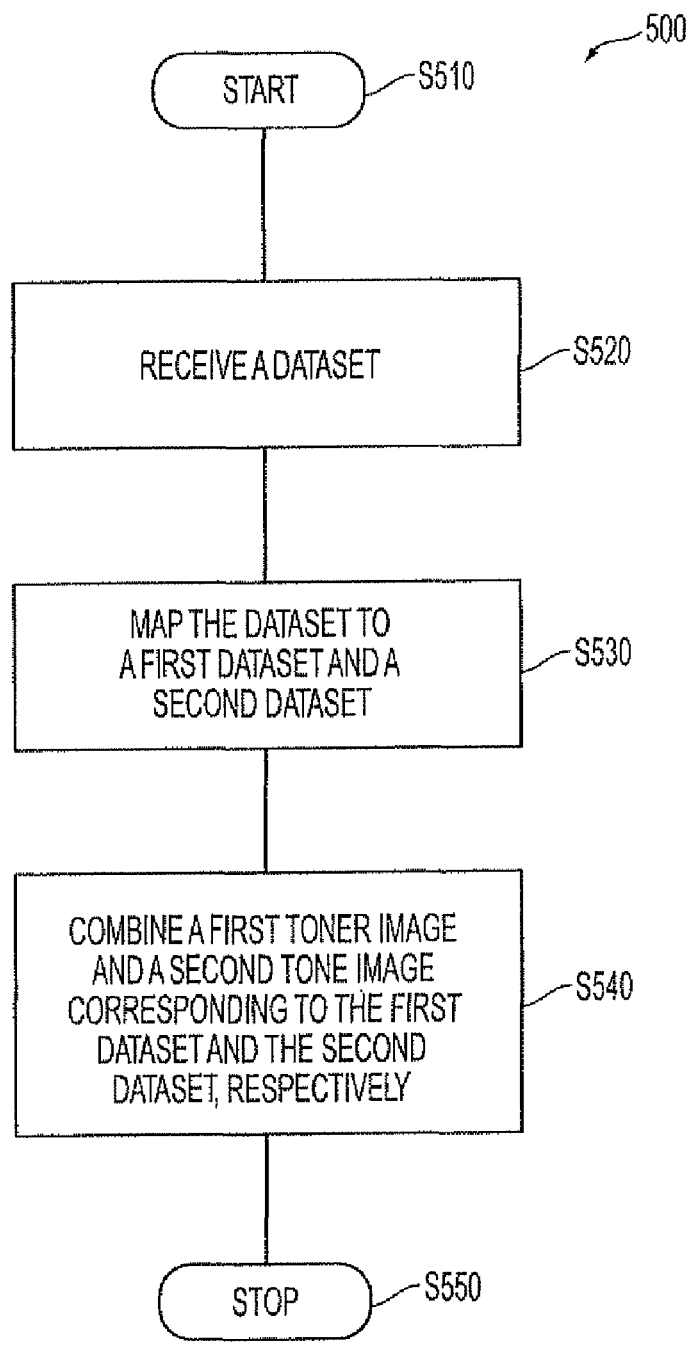
FIG. 5 shows a flowchart outlining an exemplary printing process.

FIG. 5 shows a flowchart outlining an exemplary printing process according to the disclosure. The process starts at step S510 and proceeds to step S520. In step S520, a controller coupled to a printing system may receive a dataset. The dataset may control the printing system to print a desired toner image with a fully pigmented toner. The printing system may include a noise sensitive optical density range, which may lower the image quality of the desired toner image. In an embodiment, the controller may determine if the dataset includes a value that can result in a printing within the noise sensitive optical density range of the printing system. Then, the process proceeds to step S530.

In step S530, the controller may output a first dataset and a second dataset. The first dataset can correspond to a first printing with the fully pigmented toner. The second dataset can correspond to a second printing with a lightly pigmented toner. In an embodiment, the controller may include a set of tone reproduction curves that can convert the dataset to the first dataset and the second dataset. Then, the process proceeds to step S540.

In step S540, the printing system may perform the first printing to produce a first toner image and perform the second printing to produce a second toner image. Further, the printing system may combine the first toner image with the second toner image to result in a toner image that has substantially the same optical density as the optical density of the desired toner image. In addition, the combination of the first toner image and second toner image may have reduced image noises.

In an embodiment, the controller executing step S520 and step S530 is within the printing system and can be coupled with the printing system internally. In another embodiment, the controller executing step S520 and step S530 is out of the printing system, and may be coupled with the printing system externally. Then, the process proceeds to step S550 and terminates.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for printing performed by a printing system, comprising:
    receiving a dataset corresponding to a printing of the printing system using a darkly pigmented toner, the printing system having an undesirable optical density printing range for the darkly pigmented toner, wherein the undesirable optical density printing range is within a midtone region between an optical density value of 0 and 1;
    converting the dataset to a first dataset corresponding to a first printing of the printing system using the darkly pigmented toner, and a second dataset corresponding to a second printing of the printing system using a lightly pigmented toner, wherein the first dataset avoids the undesirable optical density printing range for the darkly pigmented toner, and
    a combination of the first printing and the second printing provides a substantially same printed optical density corresponding to the received dataset, and converting the dataset converts a value in the dataset that is in the undesirable optical density printing range to a first value in the first dataset that is lower than the undesirable optical density printing range, and a second value in the second dataset that is higher than the undesirable optical density printing range.

2. The method according to claim 1, wherein the undesirable optical density printing range comprises a peak noise range.

3. The method according to claim 1, wherein converting the dataset to the first dataset and the second dataset further comprises:
    converting the dataset to the first dataset and the second dataset based on a set of tone reproduction curves (TRCs).

4. The method according to claim 1, further comprising:
    determining a loading of the lightly pigmented toner based on the undesirable optical density printing range.

5. The method according to claim 1, wherein at least one of the darkly pigmented toner and the lightly pigmented toner comprises an emulsion aggregation toner.

6. The method according to claim 5, wherein the lightly pigmented toner and the darkly pigmented toner have the same hue.

7. The method according to claim 1, wherein the lightly pigmented toner and the darkly pigmented toner have the same hue.

8. The method according to claim 1, wherein the second value in the second dataset is constant.

9. The method according to claim 1, wherein the first value in the first dataset is constant.

10. A controller configured to receive a dataset corresponding to a printing of a printing system using a darkly pigmented toner, the printing system having an undesirable optical density printing range for the darkly pigmented toner, wherein the undesirable optical printing range is within a midtone region that is between an optical density value of 0 and 1; and
    convert the dataset to a first dataset corresponding to a first printing of the printing system using the darkly pigmented toner, and a second dataset corresponding to a second printing of the printing system using a lightly pigmented toner, wherein the first dataset avoids the undesirable optical density printing range for the darkly pigmented toner, a combination of the first printing and the second printing provides a substantially same printed optical density corresponding to the received dataset, and converting, the dataset converts a value in the dataset that is in the undesirable optical density printing range to a first value in the first dataset that is lower than the undesirable optical density printing range, and a second value in the second dataset that is higher than the undesirable optical density printing range.

11. The controller according to claim 10, wherein the undesirable optical density printing range comprises a peak noise range.

12. The controller according to claim 10, further comprising:
    a memory device configured to store a set of tone reproduction curves, wherein the controller is further configured to convert the dataset to the first dataset and the second dataset based on the set of tone reproduction curves.

13. A printing system, comprising:
    a first developer configured to provide a darkly pigmented toner for development, the printing system having an undesirable optical density priming range for the darkly pigmented toner, wherein the undesirable optical printing range is within a midtone region that is between an optical density value of 0 and 1;
    a second developer configured to provide a lightly pigmented toner for development; and
    a controller configured to provide a first dataset corresponding to a first printing of the printing system using the first developer, and a second dataset corresponding to a second printing of the printing system using the second developer, wherein the first dataset avoids the undesirable optical density printing range for the darkly pigmented toner, the controller is configured to combine a first toner image from the first printing and a second toner image from the second printing,
    providing the first dataset provides a first value in the first dataset that is lower than the undesirable optical density printing range, and providing a second dataset provides a second value in the second dataset that is higher than the undesirable optical density printing range.

14. The printing system according to claim 13, wherein the controller is further configured to receive a dataset, and convert the dataset to the first dataset and the second dataset, and a combination of the first printing and the second printing providing a substantially same printed optical density corresponding to the received dataset.

15. The printing system according to claim 13, wherein the controller further comprises:
   a memory device configured to store a set of tone reproduction curves, wherein the controller is further configured to convert the dataset to the first dataset and the second dataset based on the set of tone reproduction curves.

16. The printing system according to claim 13, wherein at least one of the darkly pigmented toner and the lightly pigmented toner comprises an emulsion aggregation toner.

17. The printing system according to claim 16, wherein the lightly pigmented toner and the darkly pigmented toner are of the same hue.

18. The printing system according to claim 13, wherein the lightly pigmented toner and the darkly pigmented toner are of the same hue.

19. The printing system according to the claim 13, wherein the controller is further configured to receive the first dataset and the second dataset from a coupled device.

* * * * *